United States Patent Office 3,741,978
Patented June 26, 1973

3,741,978
CERTAIN O,O-DI ($C_1$ AND $C_2$ ALKYL) PHOSPHORODITHIOATE AND PHOSPHOROTHIOATE ESTERS USEFUL AS INSECTICIDES AND ACARICIDES
Joel D. Jamison, Mountainside, N.J., assignor to Hercules Incorporated, Wilmington, Del.
No Drawing. Continuation-in-part of application Ser. No. 694,883, filed Jan. 2, 1968. This application Apr. 21, 1971, Ser. No. 136,251
Int. Cl. C07d 9/06
U.S. Cl. 260—309.5          5 Claims

ABSTRACT OF THE DISCLOSURE

Disclosed are compounds of the formula:

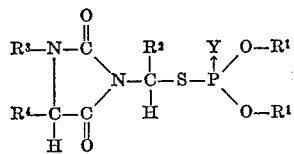

in which Y is O or S, each $R^1$ is selected from the group consisting of $CH_3$ or $C_2H_5$, and $R^2$, $R^3$ and $R^4$ are H or $CH_3$ with at least one of $R^2$ and $R^3$ being $CH_3$, and the use of these compounds as insecticides and acaricides.

---

The application is a continuation-in-part of the copending U.S. patent application, Ser. No. 694,883, now abandoned, filed Jan. 2, 1968.

This invention relates to certain organophosphorous compounds containing the hydantoin ring system, and to their use as insecticides and acaricides.

The compounds of this invention are represented by the general structural formula:

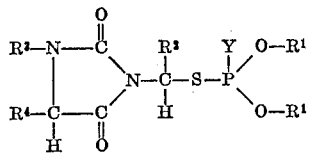

in which Y is O or S, each $R^1$ is selected from the group consisting of $CH_3$ or $C_2H_5$, and $R^2$, $R^3$ and $R^4$ are H or $CH_3$ with at least one of $R^2$ and $R^3$ being $CH_3$. Specific examples of the compounds are given in the working examples that follow.

Most of the compounds of this invention are oils at 20–25° C. The others are solid at 20–25° C. In general the compounds of this invention are insoluble in water, but soluble to the extent sufficient for use as insecticides in solvents such as acetone and the like and in solvents such as benzene and the like. In general the compounds of this invention are toxic at low concentrations to a number of insects and acarids. Hence, they are useful as insecticides and acaricides.

The compounds of this invention are made by one of two processes depicted by the following equations in which

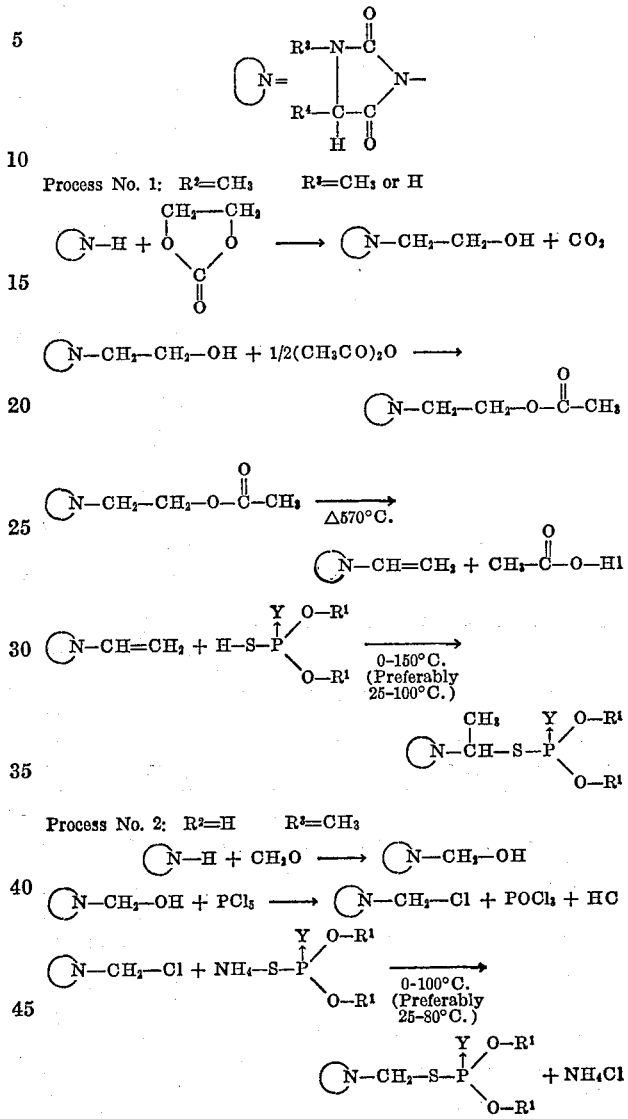

For insecticidal and acaricidal uses the compounds of this invention preferably are incorporated into dispersible compositions which can be solid or liquid.

For insecticidal and acaricidal uses the compounds of this invention preferably are incorporated into dispersible compositions. Such a composition comprises an effective quantity of toxic material and application aid material.

The toxic material consists essentially of at least one compound of this invention. In some embodiments of this composition of the toxic material comprises only one compound of this invention. In other embodiments the toxic material comprises two or more compounds of this invention. In still other embodiments, it comprises other substances toxic to one or more insects or acarids, depending on what is desired.

Specific embodiments of the composition of this invention range from concentrates of the toxic material to the ultimate composition that is applied to the habitat of the insects or acarids to be controlled. Accordingly, an effective concentration of the toxic material in the composition of this invention is in a broad range, generally being from about 0.1 to about 90% by weight of the composition. Higher and lower concentrations, however, are within the broader scope of this invention. In concentrate embodiments, the concentration of the toxic material generally is in a range from about 10 to about 90% by weight of the composition and preferably in a range from about 10 to about 50% by weight of the composition. In the ultimate use embodiments, the concentration generally is in a range from about 0.1 to about 20% by weight of the composition and preferably in a range from about 0.5 to about 10% by weight of the composition.

Application aid material is generally inert material that facilitates distribution or dispersion of the toxic material when it is applied to the habitat of the insects or acarids to be controlled. It encompasses diluents, carriers, extenders, surfactants, spreading agents, sticking agents, wind drift control agents, and the like. It also includes inert gas of the kind that is employed in aerosol sprays, when the toxic material is to be applied by aerosol spraying.

In those embodiments of the composition of this invention, which are normally solid, the application aid material generally comprises an inert solid in a divided condition.

Some embodiments of the solid composition are granular, while others are dispersible powders or dusts.

The granular compositions are of the coated type, the impregnated type or the incorporated type.

The coated type of granular composition is made by dusting a wettable powder or ground powder comprising the toxic material onto granular carrier material which either before or after the dusting has been admixed with an adhesive or a sticker. Water, oils, alcohols, glycols, aqueous gums, waxes and the like including mixtures thereof, are used as stickers. Examples of granular carrier material include attaclay, corn cobs, vermiculite, walnut hulls and almost any granular mineral or organic material screened to the desired particle size (generally 15–60 mesh, preferably about 30 mesh, U.S. screen size). Generally the toxic material is about 2–20% by weight of the composition, the sticker is generally about 5–40% by weight of the composition, and the granular carrier material is generally about 60–93% by weight of the composition.

In the case of the impregnated type of granular composition, the toxic material as such when liquid or after melting, or dissolved in a solvent, is sprayed on or poured into the granular carrier material. The solvent can be removed by evaporation, or permitted to remain. In either case, the toxic material impregnates the particles of the granular carrier material. Examples of the granular carrier material include those just mentioned with respect to the coated type of granular composition. The insecticidal material is generally about 2–20% by weight of the composition, while the granular carrier material is generally about 80–98% by weight of the composition.

The incorporated type of granular composition is made by admixing the toxic material with an inert finely divided solid such as, for example, clay, carbon, plaster of paris and the like, and made into a mud with water or other inert evaporable liquid. The mud is then dried to a solid sheet or cake, broken up or comminuted, and screened to the desired particle size (generally 15–60 mesh, preferably about 30 mesh, U.S. screen size). In other embodiments, the mud is put into a granular pan and granules are formed therein with subsequent removal of the water or solvent. In still another procedure, the mud is extruded through a die into rods which are cut into small pieces. In the incorporated type of granular composition, the toxic material generally is about 2–50% by weight of the composition, and the solid carrier material is about 50–98% by weight of the composition.

In all granular embodiments of the composition of this invention, various additives in minor concentrations relative to the carrier material also can be present.

In other embodiments of the solid composition of this invention, the carrier is usually a dispersible inert solid. A typical dispersible solid of this type is clay. Other suitable solids (dispersible solid) include talc, attapulgite, pyropylite, diatomaceous earth, kaolin, aluminum magnesium silicate, montmorillonite, fullers earth, sawdust and the like. The solid dispersible composition can be air dispersible, in which case it is usually referred to as a dust. Generally, when it is intended that the composition be water dispersible, the composition preferably contains emulsifying material (one or more surfactants) at a concentration sufficient to enable a suspension of the desired degree of stability to be formed when the composition is admixed with a suitable quantity of water. The composition in such case is usually referred to as a wettable powder. A typical dispersible solid composition of this invention generally comprises about 10–50% by weight of toxic material, about 50–90% by weight of solid carrier material and, when emulsifying material is present, about 1–10% by weight of emulsifying material.

Other specific embodiments of the toxic composition of this invention comprise homogeneous liquid solutions of toxic material in inert, preferably volatile, usually water immiscible solvents for the toxic material. Examples of suitable solvents include isophorone, cyclohexanone, methyl isobutyl ketone, acetone, xylene, benzene, toluene, and the like. Such a solution, which can be regarded as a concentrate, typically comprises about 10–50% by weight of toxic material and about 50–90% by weight of solvent. The solution can be applied as is, or diluted with more solvent, or dispersed in water, or water dispersed in it. Preferably, when it is intended that the solution be dispersed in water or water dispersed in it, the mixture of solution and water also comprises emulsifying material at a concentration sufficient to enable a dispersion of the desired degree of stability to be formed when the solution or concentrate is mixed with water. A typical emulsifying material concentration is about 1–10% by weight of the concentrate. The water concentration generally is such that the toxic material concentration preferably is about 0.5–10% by weight of the total composition.

Examples of the surfactants employed in both the liquid and solid compositions of this invention comprise the well-known surface active agents of the anionic, cationic and non-ionic types and include alkali metal (sodium or potassium) oleates and similar soaps, amine salts of long chain fatty acids (oleates), sulfonates, animal and vegetable oils (fish oils and castor oil), sulfonated acyclic hydrocarbons, sodium salts of lignin sulfonic acids, alkylnaphthalene sodium sulfonates, sodium lauryl sulfonate, disodium monolauryl phosphate, sorbitol laurate, pentaerythritol monostearate, glycerol monostearate, polyoxyethylene, ethylene oxide condensates of stearic acid, stearyl alcohol, stearyl amine, rosin amines, dehydroabietyl amine and the like, lauryl amine salts, dehydroabietyl amine salts, lauryl pyridium bromide, stearyl trimethylammonium bromide, and cetyl dimethylbenzylammonium chloride. Still other examples are listed in "Detergents and Emulsifiers—1968 Annual" by John W. McCutchen.

In addition to the toxic material and application aid material, some specific embodiments of the insecticidal composition of this invention comprise one or more other components, examples of which include other insecticides and acaricides, insect and acarid attractants, herbicides, fungicides, plant nutrients, and the like.

The dispersible composition of this invention is used by applying it by conventional ways and means to the habitat of the insect or acarid to be controlled. When it is desired to take advantage of the systemic toxicity of a systemically active compound of this invention, the composition is applied as by spraying to the seeds of plants on which the systemically affected insects feed prior to planting, by laying or drilling the composition in granular form next to or with the seeds being planted, or spraying or dusting the leaves of the growing plants in the early stages of their growth.

The rate of application of the dispersible composition of this invention is such as to provide an effective concentration of the toxic material in the habitat of the insect or acarid to be controlled. Such a concentration depends on the toxic material and on the insect or acarid to be controlled.

The best mode now contemplated of carrying out this invention is illustrated by the following working examples of various aspects of this invention, including specific embodiments. This invention is not limited to these specific embodiments. In the examples all percentages are by weight unless otherwise indicated.

EXAMPLE 1

This example illustrates how to make O,O-dimethyl S-(1-methyl - 2,4 - imidazolidinedione-3-yl)methyl phosphorodithioate.

A mixture of 285 g. of 1-methyl-2,4-imidazolidinedione, 80 g. of paraformaldehyde and 1.0 g. of barium hydroxide is melted and heated at 90° C. for one hour. The melt is taken into 1200 ml. methylene chloride and treated with 550 g. (2.64 m.) of phosphorus pentachloride at 0° C. After 18 hours at room temperature, the solvent is removed and the crude mixture distilled to give 301.4 g. of an intermediate product consisting essentially of 3-chloromethyl-1-methyl-2,4-imidazolidinedione (B.P. 155° C./4.0 mm.; found: Cl=21.7%, calculated: Cl=21.8%).

A mixture of 9.8 g. of 3-chloromethyl-1-methyl-2,4-imidazolidinedione and 11.0 g. of ammonium O,O-dimethyl phosphorodithioate in 50 ml. acetonitrile is stirred for 10 hours at 25° C., and then for 3 hours at 60° C. The mixture is then poured into 200 ml. water. The organic layer is taken up in 100 ml. benzene, and the benzene solution is washed with 5% aqueous sodium bicarbonate solution and then with water, and dried. Distilling off the benzene gives 16.1 g. of a colorless oil consisting essentially of O,O-dimethyl S-(1-methyl-2,4-imidazolidinedione-3-yl) methyl phosphorodithioate. A typical elemental analysis of the oil is $P=11.0\%$; calculated: $P=10.9\%$.

EXAMPLE 2

This example illustrates how to make O,O-diethyl S-(1-methyl-2,4-imidazolidinedione-3-yl)methyl phosphorodithioate.

8.7 g. of 3-chloromethyl-1-methyl-2,4-imidazolidinedione made as in Example 1 and 14.0 g. of ammonium O,O-diethyl phosphorodithioate are reacted by the procedure and under the conditions of the second paragraph of Example 1.

The product (11.7 g.) typically is a dark oil which analysis $P=10.0\%$ (calculated: $P=9.9\%$). It consists essentially of O,O-diethyl S-(1-methyl-2,4-imidazolidinedione-3-yl)methyl phosphorodithioate.

EXAMPLE 3

This example illustrates how to make O,O-dimethyl S-[1-(1'-methyl - 2',4' - imidazolidinedione-3'-yl)ethyl] phosphorodithioate.

A mixture of 57 g. of 1-methyl-2,4-imidazolidinedione, 46.2 g. of ethylene carbonate and 0.3 g. sodium bicarbonate is heated to 150–200° C. until $CO_2$ evolution ceases. The product mixture is cooled, diluted with 300 ml. of pyridine and treated with 60 g. of acetic anhydride. After heating this mixture at 100° C. for four hours, it is stripped of solvent, and the crude product is distilled to give 88.2 g. of purified first intermediate product (B.P., 130–136° C./0.2 mm.; elemental analysis, found: $N=13.9\%$, calculated: $N=14.0\%$) which consists essentially of 1-methyl-3-(2'-acetoxyethyl)-2,4-imidazolidinedione.

Purified first intermediate product (60 g.) is added at 0.5 ml./minute to a 12" x 1" packed tube at 550° C. The crude pyrolysate is distilled to give 18 g. of second intermediate product (B.P. 86–89° C./0.3 mm.) consisting essentially of 1-methyl-3-vinyl-2,4-imidazolidinedione.

To a solution of 7.6 g. second intermediate product in 10 ml. benzene is added dropwise 10.3 g. O,O-dimethyl phosphorodithioic acid at 25° C. An exothermic reaction occurs. The reaction mixture is permitted to stand at 25° C. for about 18 hours. The resulting solution is diluted with 50 ml. benzene, washed with two 50 ml. portions of 5% aqueous sodium bicarbonate solution and then with water, and dried. The benzene is distilled off, leaving 15.7 g. of a clear oil consisting essentially of O,O-dimethyl S-[1-(1'-methyl-2',4'-imidazolidinedione-3'-yl)ethyl] phosphorodithioate. A typical elemental analysis of the oil is: $P=10.9\%$; calculated: $P=10.4\%$.

EXAMPLE 4

This example illustrates how to make O,O-diethyl S-[1-(1'-methyl-2',4'-imidazolidinedione-3'-yl)ethyl] phosphorodithioate.

A solution of 22.3 g. of O,O-diethyl phosphorodithioic acid in 10 ml. of benzene is added to a solution of 14.0 g. of 1-methyl-3-vinyl-2,4-imidazolidinedione (made as in Example 3) in 50 ml. of benzene without any indication of an exothermic reaction. The resulting solution is refluxed for 6 hours, cooled, washed with two 50 ml. portions of 5% aqueous sodium bicarbonate solution, two 50 ml. portions of water, and dried. The benzene is removed by distillation, leaving a yellow oil consisting essentially of O,O-diethyl S-[1-(1'-methyl-2',4'-imidazolidinedione-3-yl)ethyl] phosphorodithioate. A typical elemental analysis of the oil is: $P=9.9\%$; calculated: $P=9.5\%$.

EXAMPLE 5

This example illustrates how to make O,O-diethyl S-(1-methyl - 2,4-imidazolinidinedione-3-yl)methyl phosphorothioate.

To a solution of 20.6 g. ammonium O,O-diethyl phosphorodithioate in 100 ml. dimethylsulfoxide at 25° C. is gradually added 16.2 g. 3-chloromethyl-1-methyl-2,4-imidazolidinedione (made as in Example 1). A mild exothermic reaction typically results, raising the temperature to 37° C. After storing the reaction mixture at ambient temperature for 18 hours, the resulting solution is heated at 60° C. for 3 hours, and then cooled. The product is worked up by diluting with 1000 ml. water and extracting with methylene chloride. The organic layer is washed with water and dried, and the desired product is recovered by distilling off the methylene chloride. The product (25.5 g.) is typically a yellow oil analyzing $P=10.4\%$; calculated: $P=10.5\%$. It consists essentially of O,O-diethyl S-(1-methyl-2,4-imidazolidinedione-3-yl) methyl phosphorothioate.

EXAMPLE 6

In this example O,O-dimethyl S-(1-methyl-2,4-imidazolidinedione-3-yl)methyl phosphorothioate is made.

A mixture of 3-chloromethyl-1-methyl - 2,4 - imidazolidinedione (51.2 g.), made as in Example 1, and ammonium O,O-dimethyl phosphorothioate (53 g.) in 200 ml. of acetonitrile is stirred at 25° C. for 48 hours and at 60° C. for 3 hours. The mixture is filtered, the acetonitrile is removed, and the residue is taken up into 800 ml. of methylene chloride. The methylene chloride solution is filtered and the solvent removed to give 80.8 g. of the desired product, typically an amber oil analyzing: P= 11.8%, N=10.2% (calculated: P=11.6%, N=10.4%). The product consists essentially of O,O-dimethyl S-(1-methyl-2,4-imidazolidinedione-3-yl) methyl phosphorothioate.

EXAMPLE 7

This example pertains to O,O-dimethyl S-(1,5-dimethyl-2,4-imidazolidinedione-3-yl)methyl phosphorodithioate.

1,5-dimethyl-3-chloromethyl-2,4 - imidazolidinedione is made in the same way as 3-chloromethyl-1-methyl-2,4-imidazolidinedione as in Example 1, using 1,5-dimethyl-2,4-imidazolidinedione in place of 1-methyl-2,4-imidazolidinedione. The product distills at 109° C./2.0 mm.

A mixture of 11.6 g. 1,5-dimethyl-3-chloromethyl-2,4-imidazolidinedione and 11.5 g. ammonium O,O-dimethyl phosphorodithioate in 100 ml. acetonitrile is heated at 60° C. for 8 hours. The acetonitrile is distilled off, and the residue is diluted with 100 ml. ether, washed with 5% aqueous sodium bicarbonate solution and then with water, and dried. On distilling off the ether, there is obtained 11.0 g. of the desired product which consists essentially of O,O-dimethyl S-(1,5-dimethyl-2,4-imidazolidinedione-3-yl) methyl phosphorodithioate. The product typically analyzes P=11.9%; (calculated: P=10.4%).

EXAMPLE 8

This example is concerned with O,O-dimethyl S-[1-(2',4'-imidazolidinedione-3'-yl)ethyl] phosphorodithioate.

3-vinyl-2,4-imidazolidinedione is made in the same way as 1-methyl-3-vinyl-2,4-imidazolidinedione as in Example 3, using 2,4-imidazolidinedione in place of 1-methyl-2,4-imidazolidinedione. The product distills at 155°C./1.0 mm. and melts at 87–89° C. after recrystallization from isopropanol.

A mixture of 2.3 g. 3-vinyl-2,4-imidazolidinedione and 5 ml. O,O-dimethyl phosphorodithioic acid is heated cautiously and gradually to 95° C. with precautions for cooling to control the exothermic reaction. The reaction mixture thus formed is maintained for 3 hours at 80–90° C. The reaction mixture is cooled, diluted with 40 ml. benzene, washed with 5% aqueous sodium bicarbonate and water, and then dried. The benzene is distilled off to give 5.6 g. solid product consisting essentially of O,O-dimethyl S - [1 - (2',4' - imidazolidinedione - 3' - yl)ethyl] phosphorodithioate. This product after recrystallization from isopropyl alcohol typically melts at 110–112°C., and analyzes P=10.9%; (calculated P=10.9%).

EXAMPLE 9

This example illustrates how to make O,O-diethyl S-[1-(2',4' - imidazolidinedione - 3' - yl)ethyl] phosphorodithioate.

A mixture of 3.8 g. of 3-vinyl-2,4-imidazolidinedione and 7 g. of O,O-diethyl phosphorodithioic acid in 30 ml. of benzene is heated 6 hours at 60° C. and refluxed 2 hours at 80° C. The resulting solution is cooled, washed, with 5% aqueous sodium bicarbonate and with water, and dried. The benzene is removed, leaving 9.6 g. of an oil which consists essentially of O,O-diethyl S-[1-(2',4'-imidazolidinedione-3'-yl)ethyl] phosphorodithioate. A typical analysis of the oil is P=11.0% (calculated: P=10.0%).

EXAMPLE 10

This example illustrates an emulsifiable concentrate of this invention and how to make it.

The formulation of this concentrate is as follows:

| Components | Quantities |
|---|---|
| Toxic material | 1 part by weight. |
| Polyoxyethylene (20) sorbitan monolaurate | 1 part by volume. |
| Toluene | 1 part by volume. |

Each part by weight bears the same relationship to each part by volume as the kilogram to the liter. The toxic material consists essentially of one or more of the products of Examples 1–9.

The emulsifiable concentrate of the above formulation is made by admixing the components at 20–25° C.

The emulsifiable concentrate is used by admixing it with sufficient water to give an oil-in-water emulsion in which the concentration of the toxic material is about 1% by weight of the emulsion.

The emulsion is used by spraying it over the habitat of the insects or acarids to be controlled.

Typical results obtained in the insecticidal and acaricidal testing of the products of Examples 1–9 are presented in Table II. The procedure followed to obtain these data is as follows.

An emulsifiable concentrate of the product and having the formulation of Example 11 is made and admixed with enough water to give an oil-in-water emulsion in which the toxic material concentration is 1.0% by weight of the emulsion. For lower concentrations, portions of the emulsion were admixed with the quantities of distilled water needed to give the desired concentration.

In a number of instances, if a sample of the product at the initial test concentration resulted in a 100% kill of a particular insect or acarid, it was tested at lower concentrations relative to that insect or acarid.

Exemplary of the test procedures are the contact toxicity tests on the Mexican bean beetle, pea aphid and two-spotted mite and the systemic toxicity tests on the two-spotted mite and pea aphid, which are described as follows:

Contact toxicity test—Mexican bean beetle

Mexican bean beetle.—A freshly cut 7 centimeter leaf of a lima bean plant is supported by its stem placed in a cotton-stoppered 3.5 milliliter water-filled vial, and the leaf is sprayed with emulsion and allowed to dry. The leaf in its vial is placed in a plastic sandwich box 11 x 13 x 4 centimeters with 10 Mexican bean beetle larvae (2nd to 3rd instar) and held at 78° F. and 50% relative humidity for 48 hours. The mortality is then observed.

Contact toxicity test—Pea aphid

Ten adult pea aphids are placed in the cover of a cylindrical screen cage and sprayed with emulsion. The aphids are then placed on a pea plant in the cylindrical cage, the cover put in place, and the caged aphids held for 24 hours at 60–65° F. and 50% relative humidity. The percent mortality is then determined.

Contact toxicity test—two-spotted mite

Lima bean seedlings 5–6 days old are infested with with 50 phosphate-resistant two-spotted mites at various growth stages, and the emulsion is sprayed on both sides of the leaves of the infested plants to run-off. The seedling stems are placed in fresh water, and held at 78° F. at 50% relative humidity for 6 days. The mortality is then determined.

Systemic toxicity test—Two-spotted mite

A rooted lima bean seedling (5–6 days old) which has been grown under test conditions is placed in a culture tube containing emulsion. Fifty to one hundred Two-spotted mites which are not phosphate resistant are placed on the leaves of the seedling immediately. The seedling is then stored at 78° F. and 50% relative humidity for 6 days. The kill is then determined.

Systemic toxicity test—Pea aphid

A rooted lima bean seedling (5–6 days old) which has been grown under test conditions is placed in a culture tube containing emulsion. Twenty-four hours later 10 adult pea aphids are placed on the leaves of the seedling. The seedling is then held at 60–65° F. and 50% relative humidity for 2 days. The mortality is then observed.

MORTALITIES IN PERCENT KILL/CONCENTRATION
[In percent by weight unless indicated as p.p.m. or mg./ft.²]

| Product of Example | Structural formula | Contact toxicity test data | | | | | | | | Contact toxicity test data | | | Systemic toxicity test data conc. in p.p.m. | |
|---|---|---|---|---|---|---|---|---|---|---|---|---|---|---|
| | | HF | MBB | PA | SAW | Resistant TSM | PC | YFM conc. in mg./ft.² | YFML conc. in p.p.m. | CRW | PAS | TSMS |
| 1 | (structure with N-CH₂-S-P(=S)(O-CH₃)(O-CH₃)) | 72/.05; 40/.025 | 100/.005; 100/.0025 | 100/.005; 90/.001 | 50/.05; 0/.025 | 100/.01; 70/.005 | 0/.1 | 0/100 | 100 | 100/.05; 40/.01 | 100/50; 100/10 | 100/50; 100/10 |
| 2 | (structure with N-CH₂-S-P(=S)(O-C₂H₅)(O-C₂H₅)) | 20/.05; 8/.025 | 100/.005; 100/.0025; 100/.001 | 100/.005; 100/.0025; 100/.001 | 0/.05 | 100/.05; 90/.0025 | 0/.05 | 0/100 | 0/.01 | 67/.05 | 100/50; 100/10 | 100/50; 80/10 |
| 3 | (structure with N-CH₂-S-P(=S)(O-CH₃)(O-CH₃)) | 100/.05; 88/.025 | 100/.005 | 100/.005; 80/.0025 | 80/.1; 40/.05 | 100/.01; 80/.005 | 100/.05; 60/.025 | 80/100 | 100/.1; 0/.01 | 40/.025; 10/.005 | 100/.10; 100/5 | 100/10; 100/5 |
| 4 | (structure with N-CH₂-S-P(=S)(O-C₂H₅)(O-C₂H₅)) | 80/.05 | 100/.0025; 100/.001 | 100/.0025; 100/.001 | 30/.1 | 60/.1 | 40/.1 | 90/100 | 100/.1; 0/.01 | 0/.05 | 100/.50; 100/10 | 0/50 |
| 5 | (structure with N-CH₂-S-P(=O)(O-CH₃)(O-CH₃)) | 76/.05 | 100/.1; 80/.005; 70/.001 | 100/.01; 100/.005; 100/.001 | 100/.1; 20/.025 | 100/.1; 70/.01; 50/.001 | 100/.05; 100/.025; 60/.01 | 0/100 | 100/.1; 0/.01 | 0/.05 | 100/50 | 100/50; 80/10; 70/5 |
| 6 | (structure with N-CH₂-S-P(=O)(O-CH₃)(O-CH₃)) | 100/.05; 92/.025; 40/.01 | 100/.005; 100/.001 | 100/.005; 100/.001 | 100/.1; 100/.05; 60/.025; 50/.01 | 100/.025; 100/.01; 100/.005 | 100/.025; 100/.005; 0/.001 | 0/100 | 100/.1; 0/.01 | 0/.05 | 100/50; 100/10 | 100/50; 100/10 |

MORTALITIES IN PERCENT KILL/CONCENTRATION—Continued

[In percent by weight unless indicated as p.p.m. or mg./ft.²]

| Product of Example | Structural formula | Contact toxicity test data | | | | | | Contact toxicity test data | | Systemic toxicity test data conc. in p.p.m. | | |
|---|---|---|---|---|---|---|---|---|---|---|---|---|
| | | HF | MBB | PA | SAW | Resistant TSM | PC | YFM conc. in mg./ft.² | YFML conc. in p.p.m. | CRW | PAS | TSMS |
| 7 | 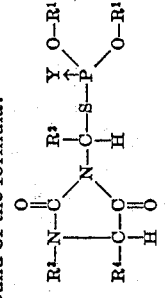 | 100/.05; 20/.025 | 100/.005; 80/.001 | 100/.005; 20/.001 | 0/.1 | 100/.1; 10/.01 | 0/.1 | 0/100 | 100/.1; 0/.01 | 0/.05 | 100/50 | 100/50 |
| 8 | | 100/.05; 92/.025; 60/.01 | 70/.01; 0/.005 | 100/.005; 60/.0025 | 0/.1 | 60/.1; 20/.005 | 100/.05; 100/.025 | 100/100 | | 100/.05; 20/.01 | 100/50; 100/10 | 100/50; 50/10 |
| 9 | | 24/.05 | 100/.1; 90/.005 | 100/.01; 100/.005; 70/.001 | 50/.1 | 90/.1; 10/.01 | 0/.1 | 0/100 | 0/.1 | 0/.05 | 100/50; 100/10; 100/5 | 100/50; 90/10; 80/5 |

NOTE.—HF=House fly; MBB=Mexican bean beetle; PA=Pea aphid; SAW=Southern army worm; TSM=Two-spotted mite; PC=Plum curculio; PAS=Pea aphid systemic; TSMS=Two-spotted mite systemic; YFM=Yellow fever mosquito; YFML=Yellow fever mosquito larvae; CRW=Corn root worm.

From these data it can be seen that the compounds of this invention as a group have both contact and systemic toxicities at practical concentrations to insects and acarids. Hence, this invention provides new and useful insecticides and acaricides.

These and other features, advantages and specific embodiments of this invention will become readily apparent to those exercising ordinary skill in the art after reading the foregoing disclosures. Such specific embodiments are within the scope of the claimed subject matter unless expressly indicated to the contrary by claim language. Moreover, while specific embodiments of this invention have been described in considerable detail, variations and modifications of them can be effected without departing from the spirit and scope of the invention as disclosed and claimed.

The term "consisting essentially of," as used in this specification excludes any unrecited substance at a concentration sufficient to substantially adversely affect the essential properties and characteristics of the composition being defined, while permitting the presence of one or more unrecited substances at concentrations insufficient to substantially adversely affect said essential properties and characteristics.

What I claim and desire to protect by Letters Patent is:

1. A compound of the formula:

$$R^4-N-\overset{O}{\underset{}{C}}-\overset{R^3}{\underset{CH_3}{N}}-CH_2-\overset{Y}{\underset{}{S}}-\overset{Y}{\underset{}{P}}\overset{O-R^1}{\underset{O-R^1}{}}$$
$$R^2-\overset{}{\underset{H}{C}}-\overset{}{\underset{CH_3}{C}}=O$$

in which Y is O or S, each $R^1$ is selected from the group consisting of $CH_3$ or $C_2H_5$, and $R^2$, $R^3$ and $R^4$ are H or $CH_3$ with at least one of $R^2$ and $R^3$ being $CH_3$.

2. A compound according to claim 1 in which each $R^1$ is $CH_3$, $R^2$ is H, $R^3$ is $CH_3$, and $R^4$ is H, Y is S.

3. A compound according to claim 1 in which each $R^1$ is $CH_3$, $R^2$ is H, $R^3$ is $CH_3$, $R^4$ is H and Y is O.

4. A compound according to claim 1 in which each $R^1$ is $CH_3$, $R^2$ is $CH_3$, $R^3$ is $CH_3$, $R^4$ is H, and Y is S.

5. A compound according to claim 1 in which each $R^1$ is $C_2H_5$, $R^2$ is H, $R^3$ is $CH_3$, $R^4$ is H, and Y is S.

References Cited

UNITED STATES PATENTS

| | | | |
|---|---|---|---|
| 2,754,244 | 7/1956 | Gysin et al. | 260—310 R |
| 2,844,582 | 7/1958 | Raley | 260—310 R |
| 2,928,841 | 3/1960 | McConnell et al. | 260—309.5 |
| 2,553,770 | 5/1951 | Kittleson | 260—309.5 |
| 2,886,487 | 5/1959 | Kupferberg et al. | 260—309.5 |
| 2,914,530 | 11/1959 | Schrader et al. | 260—248 |
| 3,111,525 | 11/1963 | Meltzer et al. | 260—310 R |
| 3,178,447 | 4/1965 | Kohn | 260—309.5 |
| 3,185,699 | 5/1965 | Sherlock | 260—309 |

FOREIGN PATENTS

| | | | |
|---|---|---|---|
| 728,152 | 2/1966 | Canada | 260—310 R |
| 1,093,728 | 5/1955 | France | 260—309.5 |

NATALIE TROUSOF, Primary Examiner

U.S. Cl. X.R.

424—200